US009025908B2

(12) United States Patent
Vidal et al.

(10) Patent No.: US 9,025,908 B2
(45) Date of Patent: May 5, 2015

(54) SYSTEM AND METHOD FOR ALIGNING VIDEO SEQUENCES

(75) Inventors: Rene Esteban Vidal, Baltimore, MD (US); Avinash Aghoram Ravichandran, Baltimore, MD (US)

(73) Assignee: The John Hopkins University, Baltimore, MD (US)

( * ) Notice: Subject to any disclaimer, the term of this patent is extended or adjusted under 35 U.S.C. 154(b) by 634 days.

(21) Appl. No.: 12/755,862

(22) Filed: Apr. 7, 2010

(65) Prior Publication Data

US 2010/0260439 A1    Oct. 14, 2010

Related U.S. Application Data

(60) Provisional application No. 61/167,715, filed on Apr. 8, 2009.

(51) Int. Cl.
*G06K 9/32*    (2006.01)
*G06K 9/36*    (2006.01)
*G06K 9/00*    (2006.01)
*G06T 7/00*    (2006.01)

(52) U.S. Cl.
CPC .......... *G06K 9/00624* (2013.01); *G06T 7/0038* (2013.01); *G06T 2207/10016* (2013.01)

(58) Field of Classification Search
USPC .................................. 382/294, 293, 276, 300
See application file for complete search history.

(56) References Cited

U.S. PATENT DOCUMENTS

| 6,320,624 B1 | 11/2001 | Ayer et al. |
| 6,798,897 B1 | 9/2004 | Rosenberg |
| 7,289,138 B2 | 10/2007 | Foote et al. |
| 7,418,649 B2 * | 8/2008 | Li ................................ 714/784 |
| 7,428,345 B2 | 9/2008 | Caspi et al. |
| 7,583,275 B2 * | 9/2009 | Neumann et al. ............. 345/633 |
| 8,073,287 B1 * | 12/2011 | Wechsler et al. ............. 382/278 |
| 8,170,326 B2 * | 5/2012 | Gulati et al. ................. 382/154 |
| 8,224,093 B2 | 7/2012 | Grady et al. |
| 2006/0215934 A1 | 9/2006 | Peleg et al. |
| 2007/0097266 A1 | 5/2007 | Souchard |
| 2008/0056577 A1 | 3/2008 | Grady et al. |
| 2008/0247646 A1 | 10/2008 | Chefd'hotel et al. |
| 2008/0310716 A1 | 12/2008 | Jolly et al. |
| 2009/0060333 A1 | 3/2009 | Singaraju et al. |
| 2009/0097727 A1 | 4/2009 | Jolly et al. |
| 2010/0104186 A1 | 4/2010 | Grady et al. |
| 2011/0261262 A1 * | 10/2011 | Vercauteren et al. ......... 348/607 |

OTHER PUBLICATIONS

Richard Szeliski, "Image Alignment and Stitching: A Tutorial", Fundametanl Trends in Computer Graphics and Vision, vol. 2, No. 1, pp. 1-104 (2006).

Chris Harris et al., "A Combined Corner and Edge Detection", In Proceedings of the Fourth Alvey Vision Conference, pp. 147-151 (1988).

David G. Lowe et al., "Distinctive Image Features from Scale-invariant Keypoints", In International Journal of Computer Vision, vol. 60, No. 2, pp. 91-110 (2004).

(Continued)

*Primary Examiner* — Yon Couso
(74) *Attorney, Agent, or Firm* — DLA Piper LLP US

(57) ABSTRACT

Methods and Systems for aligning multiple video sequences of a similar scene. It is determined which video sequences should be aligned with each other using linear dynamic system (LDS) modeling. The video sequences are then spatially aligned with each other.

8 Claims, 6 Drawing Sheets

(56) References Cited

OTHER PUBLICATIONS

Matthew Brown et al., "Multi-Image Matching Using Multi-Scale Oriented Patches", Proceedings of the 2005 IEEE Computer Society Conference on Computer Vision and Pattern Recognition (CVPR'05), pp. 510-517, Jun. 2005.

Martin A. Fischler et al., "Random Sample Comsensus: A Paradigm for Model Fitting with Applications to Image Analysis and Automated Cartography", Communications of the ACM, vol. 24, No. 6, pp. 381-395, Jun. 1981.

Yaron Caspi et al., "Spatio-Temporal Alighment of Sequences", IEEE Transactions on Pattern Analysis and Machine Intelligence, vol. 24, No. 11, pp. 1409-1424, Nov. 2002.

Yaron Caspi et al., "Feature-Based Sequence-to-Sequence Matching", International Journal of Computer Vision, vol. 68, No. 1, pp. 53-64 (2006).

Yaron Ukrainitz et al., "Aligning Sequences and Actions by Maximizing Space-Time Correlations", In European Conference on Computer Vision, pp. 538-550 (2006).

Avinash Ravichandran et al., "Mosaicing Non-Rigid Dynamical Scenes", In Workshop on Dynamic Vision, pp. 1-13 (2007).

Gianfranco Doretto et al., "Dynamic Textures", International Journal of Computer Vision, vol. 51, No. 2, pp. 91-109 (2003).

Peter Van Overschee et al., "N4SID: Subspace Algorithms for the Identification of Combineed Deterministic-Stochastic Systems", Automatica, Special Issue in Statistical Signal Processing and Control, pp. 75-93 (1994).

Antoni B. Chan et al., "Probabilistic Kernels for the Classification of Auto-Regressive Visual Processes", in Conferecne on Computer Vision and Parttern Recognition (CVPR'05), vol. I, pp. 846-851 (2005).

Rene Vidal et al., "Optical Flow Estimation and Segmentation of Multiple Moving Dynamic Textures", In Conferecne on Computer Vision and Parttern Recognition (CVPR'05), vol. II, pp. 516-521 (2005).

Wilson J. Rugh, "Linear System Theory: Second Edition", Prentice Hall, Copyright 1996 (600 pages).

Richard Hartley et al., "Multiple View Geometry in Computer Vision: Second Edition", Cambridge University Press, Copyright 2003 (670 pages).

Yaron Caspi et al., "Sequence-to-Sequence Alignment", http://www.wisdom.weizmann.ac.il/~vision/VideoAnalysis/Demos/Seq2Seq/Seq2Seq.html, printed Apr. 7, 2014 (7 pages).

Yaron Caspi et al., "Feature-Based Sequence-to-Sequence Matching", http://www.wisdom.weizmann.ac.il/~vision/VideoAnalysis/Demos/Traj2Tray, Oct. 6, 2006 (2 pages).

Y. Ukrainitz et al., "Aligning Sequences and Actions by Maximizing Space-Time Correlations", http://www.wisdom.weizmann.ac.il/~vision/SpaceTimeCorrelations.html, Feb. 25, 2006 (8 pages).

Ali Kemal Sinop et al., "A seeded image segmentation framework unifying graph cuts and random walker which yields a new algorithm," ICCV 2007, Oct. 2007 (8 pages).

Grady et al., "Three interactive graph-based segmentation methods applied to cardiovascular imaging" in O.F. Nikos Paragios, Yunmei Chen, editor, Handbook of Mathematical Models in Computer Vision, pp. 453-469, Springer, 2006.

Avinash. Ravichandran et al., "Video Registration using Dynamic Textures", European Conference on Computer Vision, 2008 (12 pages).

Avinash Ravichandran et al., "Mosaicing Nonrigid Dynamical Scenes", International Workshop on Dynamical Vision, Oct. 2007 (13 pages).

U.S. Appl. No. 12/558,649.

\* cited by examiner

SYSTEM AND METHOD FOR ALIGNING VIDEO SEQUENCES

This application is based on provisional application 61/167,715, which was filed on Apr. 8, 2009, and which is herein incorporated by reference in its entirety.

This invention was made with government support under ISS-0447739 and EHS-0509101 awarded by the National Science Foundation and under N00014-05-1-0836 awarded by the Office of Naval Research. The government has certain rights in this invention.

DETAILED DESCRIPTION OF EMBODIMENTS OF THE INVENTION

Figure 1:
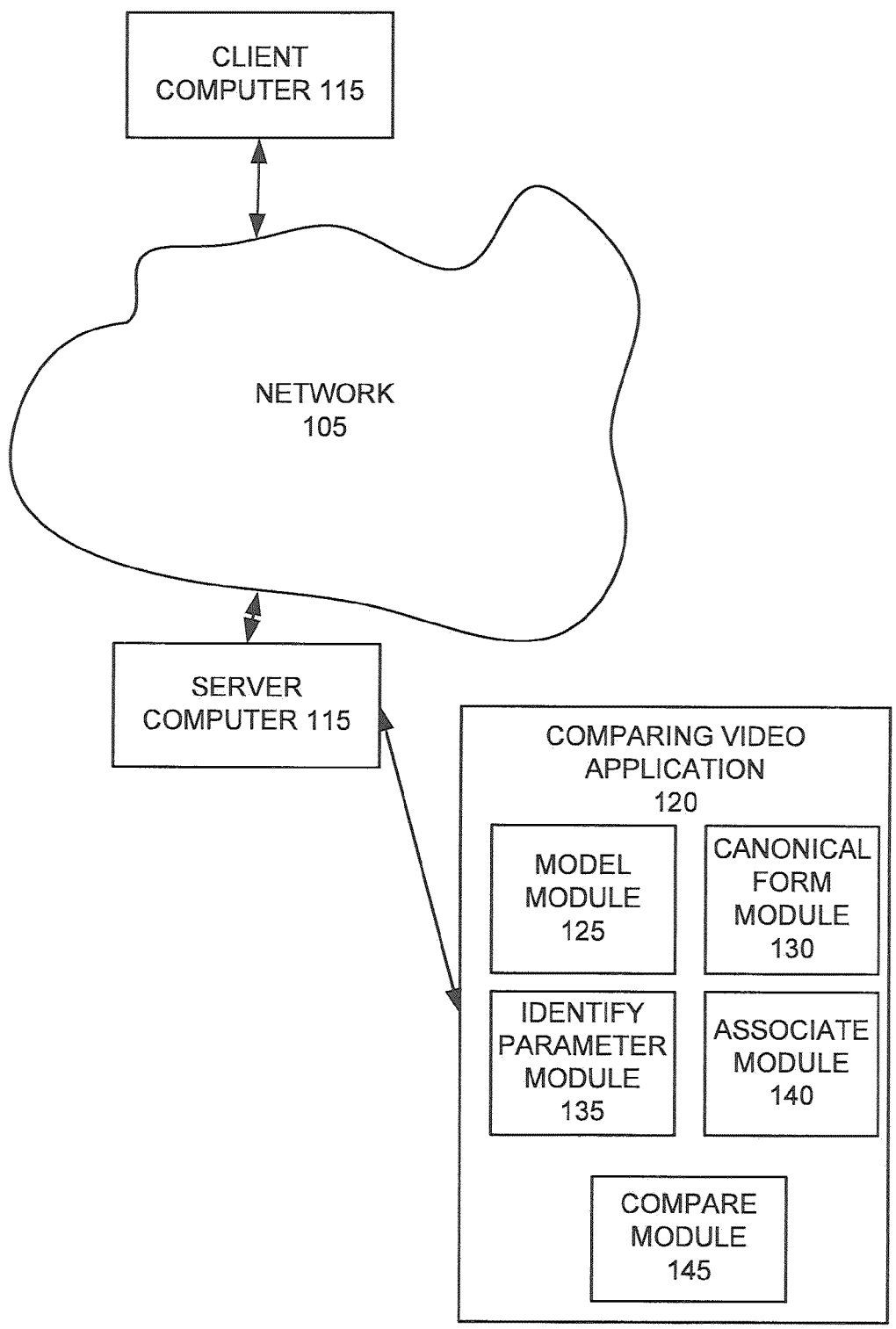
FIG. 1 illustrates a system for registering video sequences, according to one embodiment.

FIG. 1 illustrates a system for registering video sequences, according to one embodiment. The videos may be from synchronous and/or asynchronous cameras. In addition, in some embodiments, the videos may be of a rigid and/or a non-rigid scene. FIG. 1 illustrates a system 100 for presenting information, according to one embodiment. In one embodiment, server computer 110 can communicate over a network 105 (e.g., Intranet, Internet) with client computer 115. A comparing videos application 120 can run on the server computer 110. In some embodiments, a user can access the comparing videos application 120 utilizing the server computer 110. In other embodiments, the user can access the comparing videos application 120 utilizing the client computer 115, which can communicate with the server computer 110 for this purpose.

The comparing videos application 120 can comprise: model module 125, identify parameters module 135, canonical form module 130, register module 140, and compare module 145. The model module 125 can model each video sequence. In one embodiment, each video sequence can be modeled as the output of a Linear Dynamical System (LDS). The identify parameters module 135 can identify the parameters of the models (e.g., the LDSs from the multiple video sequences). The canonical form module 130 can transform the parameters into a canonical form so that the all parameters from all video sequences can be expressed with respect to the same basis. The associate parameters module 140 can associate scenes from the video sequences using the transformed parameters and register the associated scenes with each other. The compare module 145 can compare the associated images to each other using various image-comparing mechanisms.

Figure 2:
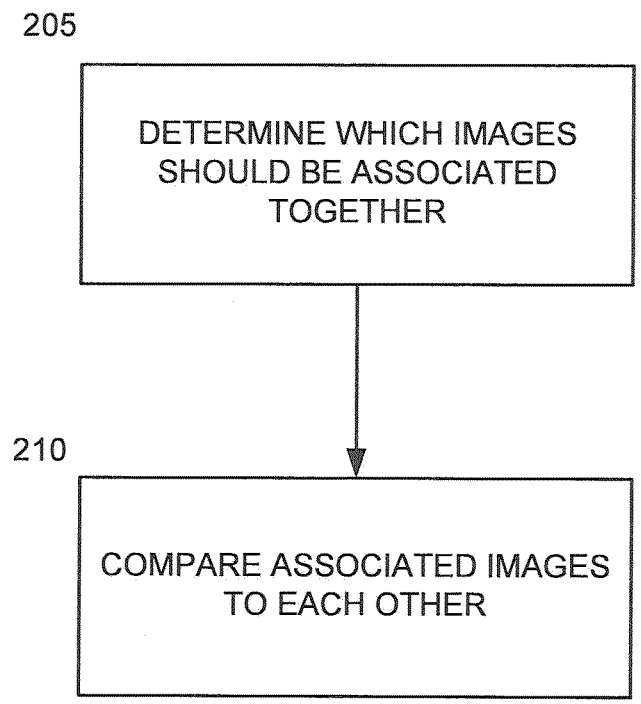
FIG. 2 illustrates a method for registering video sequences, according to one embodiment.

FIG. 2 illustrates a method for registering video sequences, according to one embodiment. In 205, it is determined which images from multiple video sequences (e.g., two or more) should be associated with one another. In 210, the associated images can be compared to each other using various image-comparing mechanisms known to those of ordinary skill in the art such as feature based methods or intensity based methods. Further details on such comparison mechanisms can be found in Szeliski, R., "Image Alignment and Stitching: A Tutorial", *Fundamental Trends in Computer Graphics and Vision,* 2(1) (2006) 1-104.

Figure 3:
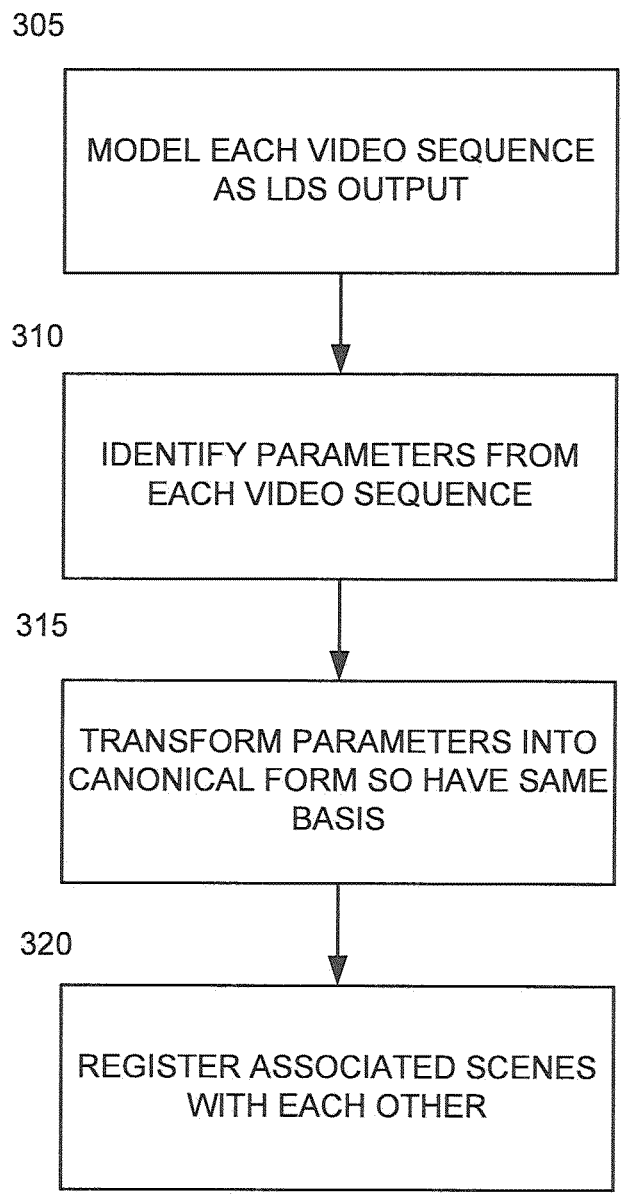
FIG. 3 sets forth details of determining which images from multiple (e.g., two or more) video sequences should be associated with one another for comparison purposes (205 of FIG. 2), according to one embodiment.

FIG. 3 sets forth details of determining which parameters extracted from multiple (e.g., two or more) video sequences should be associated with one another for comparison purposes (205 of FIG. 2), according to one embodiment.

In 305, each video sequence can be modeled, for example, as the output of a LDS. For example, the video sequence $\{I(t)\}_{t=1}^{F}$ (where $I(t)$ is a p-dimensional vector representing the image frame of the video at time t, p is the number of pixels in each image, and F is the number of frames in the video) can be modeled as the output of a LDS as follows:

$$z(t+1) = Az(t) + Bv(t)$$

$$I(t) = C^0 + Cz(t) + w(t)$$

In the above formulas, $z(t)$ is an n-dimensional vector, with n much smaller than p, representing a compressed version of the image at time t. Specifically, $z(t)$ are the coefficients needed to express the image $I(t)$ in terms of the appearance images (columns of C) which represent the appearance of the video, and the mean image $C^0$. Together, $C^0$ and C form a basis for all the images in a video. This LDS model can decouple the appearance of the video (represented by $C^0$ and C) from the temporal evolution of the video (represented by A). Since $C^0$ and C are the only model parameters that depend on the image pixels, the spatial registration can be recovered independently from the temporal lag between the video sequences. In addition, $Bv(t)$ and $w(t)$ model the error between the output of the LDS and the image $I(t)$ due to noise. These errors can be ignored (if there is no noise) or approximated (when there is noise).

Figure 4:
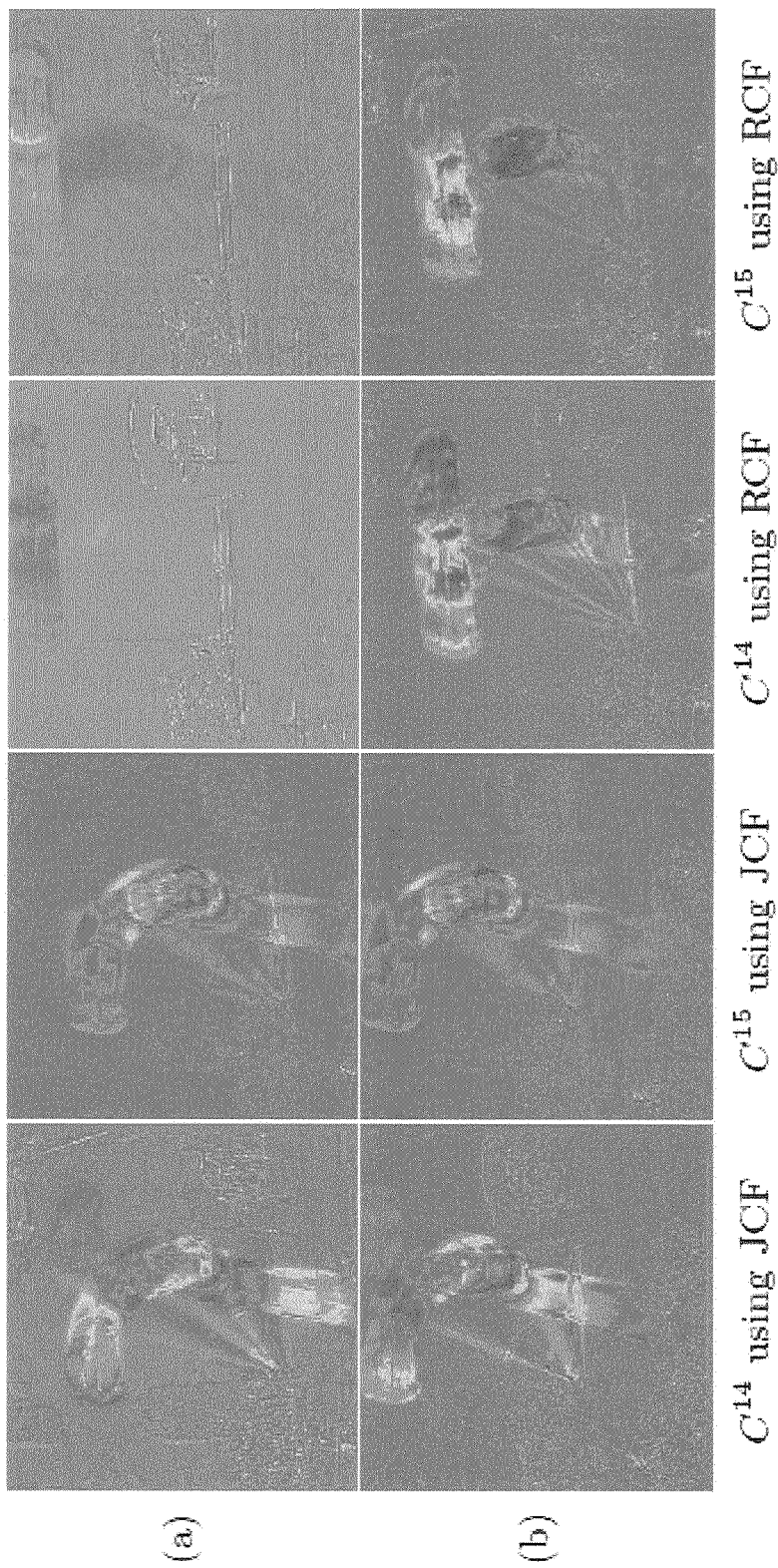
FIG. 4 illustrates sample images from two video sequences, according to one embodiment.

Note that FIG. 4 illustrates sample columns of the C matrix displayed as images from (a) a first video sequence of a parking set and (b) a second video sequence of the same parking set taken from a different viewpoint.

Referring back to FIG. 3, in 310, parameters of the LDSs from the multiple video sequences can be identified. Given $I_i(t)$ from above, $C_i^0$ (which is the temporal image mean of the images in the video) can be calculated. Then, set $\tilde{I}_i(t) = I_i(t) - C_i^0$. If the noise terms (e.g., B, v, ω) are ignored as explained above, the LDS output model is $z(t) = A^t z_0$, where $z_0$ is the initial state of the system. If there is a temporal lag for the ith video sequence of $\tau_i$ frames, then the evolution of the hidden state of the ith sequence is $z_i(t) = A^{\tau_i} z(t)$, and the mean subtracted images are $\tilde{I}_i(t) = C_i A^{\tau_i} z(t)$. At this point, the parameters C and $Z = [z(1) L\ z(F)]$ can be calculated using the singular value decomposition of the matrix W (which represents the image frames from all of the video sequences stacked into a single matrix), which can be factorized using the rank n singular value decomposition (SVD) of the matrix W as follows:

$$W = \begin{vmatrix} \tilde{I}_1(l) & L & \tilde{I}_1(F) \\ M & O & M \\ \tilde{I}_m(l) & L & \tilde{I}_m(F) \end{vmatrix}$$

$$= \begin{vmatrix} C_1 A^{\tau_1} z(l) & L & C_1 A^{\tau_1} z(F) \\ M & & M \\ C_m A^{\tau_m} z(l) & L & C_m A^{\tau_m} z(F) \end{vmatrix}$$

$$= \begin{vmatrix} C_1 A^{\tau_1} \\ M \\ C_m A^{\tau_m} \end{vmatrix} [z(l)\ L\ z(F)] = USV^T$$

where $Z = SV^T$ and $C = U$. The parameter A can then be computed as follows:

$$A = [z(2), \ldots, z(F)][z(1), \ldots, z(F-1)]^t$$

From above, the parameters A and $C_i$ were found. Then, if the $p_i$ by n matrix $C_i$ is in the matrix formed by rows $\Sigma_{j=1}^{i-1} p_j +1$ to $\Sigma_{j=1}^{i} p_i$ of C, the pair $(A, C_i)$ can be converted to a canonical form, as explained below with respect to 315.

Referring back to FIG. 3, in 315, the parameters A and $C_i$ are transformed with respect to a common (canonical) form so that the all parameters A and $C_i$ from all video sequences are expressed with respect to the same basis. In one embodiment, a Jordan Canonical Form (JCF) can be utilized. When A has 2q complex eigenvalues and n−2q real eigenvalues, the JCF is given by:

$$A_c = \begin{bmatrix} \sigma_1 & \omega_1 & 0 & & & & 0 \\ -\omega_1 & \sigma_1 & & & & & \\ 0 & & O & & & & \\ & & & \sigma_1 & \omega_1 & & \\ & & & -\omega_1 & \sigma_1 & & \\ & & & & & \lambda_1 & \\ & & & & & & O \\ 0 & & & & & & \lambda_{n-2q} \end{bmatrix}$$

$$C_c = [1 \; 0 \; L \; 1 \; 0 \; 1 \; L \; 1]$$

where the eigenvalues of $A_c$ are given by $\{\sigma_1 \pm \sqrt{-1}\omega_1, L, \sigma_q \pm \sqrt{-1}\omega_q, \lambda_1, L, \lambda_{n-2q}\}$, where $\sigma_i$ and $\omega_i$ are parameters capturing the oscillatory behavior of image intensities in the video, $\lambda_i$ captures transient behaviors, and q is the number of complex eigenvalues in each image. Additional information on the JCF can be found at W. J. Rugh. *Linear System Theory* (Prentice Hall, 2d. ed. 1996). It should be noted other canonical forms, which use a different basis (e.g., a Reachability Canonical Form (RCF), an Observability Canonical Form (OCF) can be used in other embodiments. Additional information on the RCF and the OCF can be found at W. J. Rugh, *Linear System Theory* (Prentice Hall, 2d. ed. 1996).

The procedure for converting the LDS parameters $(A, C_i)$ into any canonical form involves finding an n by n invertible matrix $M_I$ such that $(M_i A M_i^{-1}, \gamma C_i M_i^{-1}) = (A_c, C_c)$, where the subscript c represents any canonical form, and the p-dimensional vector $\gamma$ (where p is the number of pixels) is an arbitrary vector. In one embodiment, $\gamma$ can be chosen to be [1 1 L 1], so that all rows of C are weighted equally. Once M is found, M can be used to convert LDS $(A, C_i)$ into the canonical using the formula $(M_i A M_i^{-1}, C_i M_i^{-1})$.

It should be noted that the JCF is unique only up to a permutation of the eigenvalues. However, if the eigenvalues are different, a predefined way can be used to sort the eigenvalues to obtain a unique JCF.

Referring back to 320 of FIG. 3, once the parameters A and $C_i$ from the multiple video sequences are identified and transformed into a canonical form, associated scenes (e.g., static or non-static) can be spatially registered with each other. In the case of two videos, this can be done as follows: The temporal mean images $C_1^0$ and $C_2^0$ of the two videos were calculated above. Then, the system parameters $(A, C_1)$ and $(A, C_2)$ were converted into a canonical form. At this point, every column of the temporal matrix $C_i$ is converted into its image form. (The notation $C_j^i$ can be used to denote the ith column of the jth video sequence represented as an image.) A feature-based approach can then be used to spatially register the two sets of images $\{C_1^0, C_1^1, \ldots, C_1^n\}$ and $\{C_2^0, C_2^1, \ldots, C_2^n\}$. Scale Invariant Feature Transform (SIFT) features and a feature descriptor can be extracted around every feature point in the two sets of n+1 images. SIFT is a feature point that can be obtained by analyzing the gradiants (e.g., spatial) in a small image neighborhood. More information on SIFT can be found in D. Lowe, "Distinctive Image Features from Scale-Invariant Keypoints", *International Journal for Computer Vision*, Volume 20 (2003) 91-110. The features extracted from image $C_1^i$ can be matched with the features extracted from image $C_2^i$, and vice-versa, where $i \in \{0, \ldots, n\}$. Details about how such features can be extracted and matched can be found at D. Lowe, "Distinctive Image Features from Scale-Invariant Keypoints", *International Journal of Computer Vision*, Volume 20 (2003) 91-110. The matches that are consistent across both directions can be retained and the correspondences can be concatenated into the matrices $X_1 \in \mathbb{R}^{3 \times M}$ and $X_2 \in \mathbb{R}^{3 \times M}$. The corresponding columns of $X_1$ and $X_2$ are the location of the matched features in homogenous co-ordinates and M is the total matches from the n+1 image pairs. The homography H (such that $X_2 \sim H X_1$) is recovered. This can be done by running Random Sampling And Consensus (RANSAC) to obtain the inliers from the matches. RANSAC is a method that can be used to remove outliers from a set. It can be based on randomly sampling points and analyzing how consistent the model obtained with the sampled point is with the rest of the data. More information on RANSAC can be found in M. A. Fischler et al., "RANSAC Random Sample Consensus: A Paradigm for Model Fitting with Applications to Image Analysis and Automated Cartography", *Communications of the ACM*, 26 (1981) 381-395. A homography can then be fit using a non-linear method. More information about such a non-linear method can be found in R. Hartley et al., *Multiple View Geometry in Computer Vision* (Cambridge 2000). This allows the contribution of the correspondences from every image pair to be weighted equally, because the best matches given by RANSAC could arise from the mean image or the dynamic appearance images or both.

As set forth above in FIG. 2, once it is determined which images from the multiple video sequences should be associated with one another, the associated images can be compared to each other using various image-comparing mechanisms known to those of ordinary skill in the art.

Figure 5:
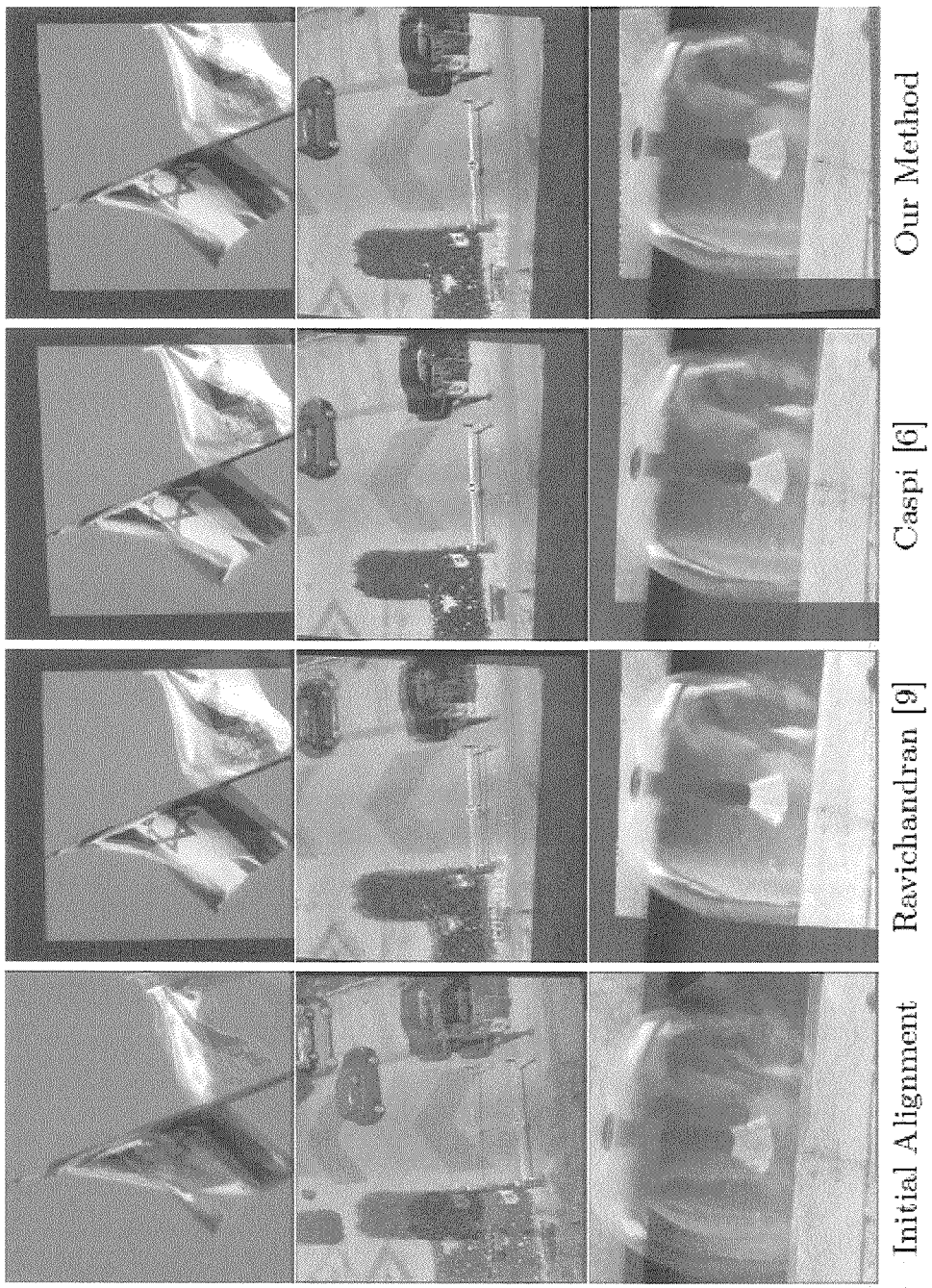
FIGS. 5-6 illustrate sample comparison results, according to several embodiments.
Figure 6:
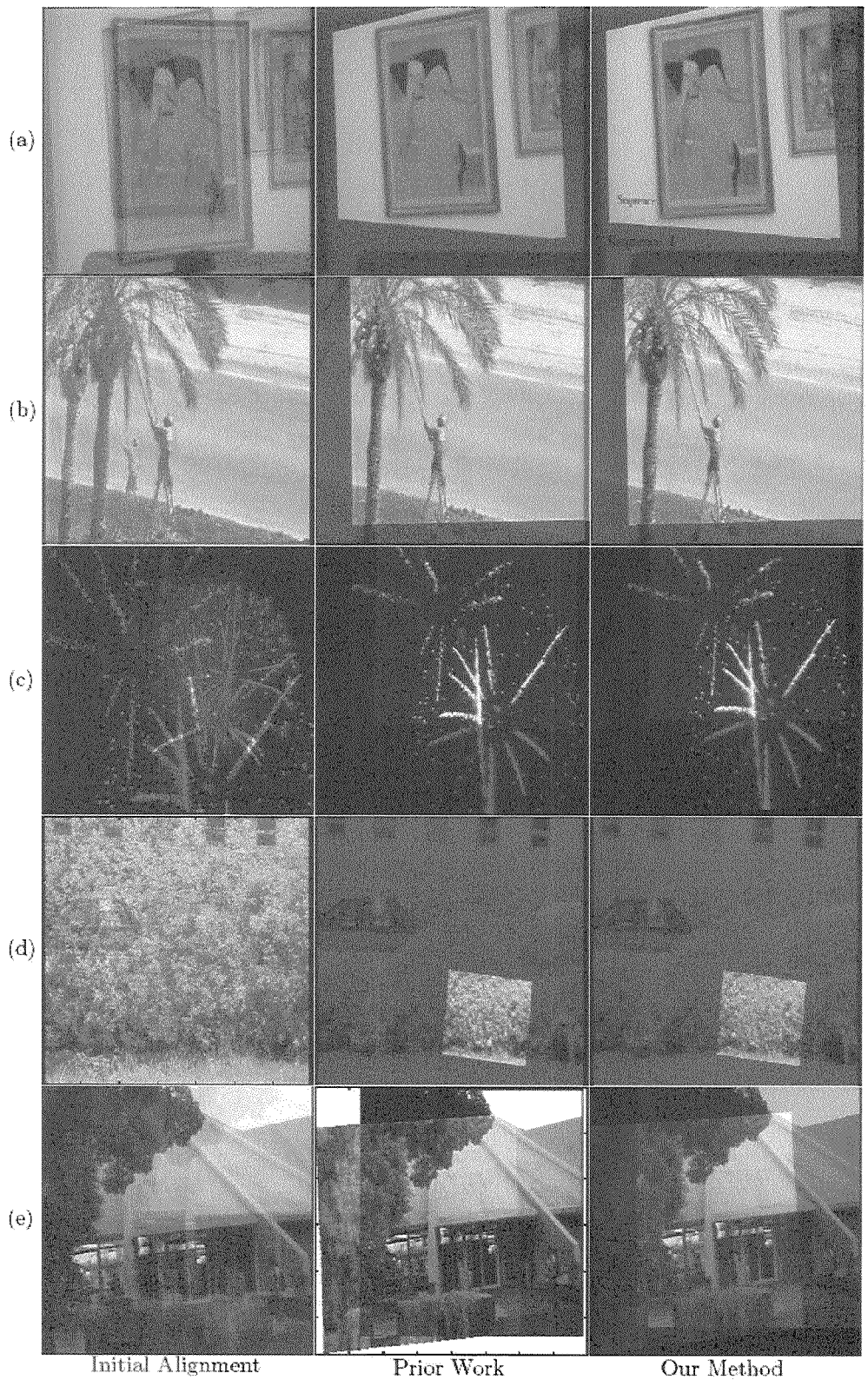

FIGS. 5-6 illustrate sample comparison results, according to several embodiments. FIG. 5 illustrates a comparison of results using the initial alignment, a Ravichandran method, a Caspi method, and the method described herein. Additional information on the Ravichandran method can be found in A. Ravichandran et al., "Mosaicing Non-rigid Dynamical Scenes", *Workshop on Dynamic Vision* (2007). Additional information on the Caspi method can be found in Y. Caspi et al., "Feature-Based Sequence-to-Sequence Matching", *International Journal of Computer Vision*, 68 (1) (2006) 53-64.

FIG. 6 illustrates additional comparisons of the results using our method against other methods. Rows (a-c) are a comparison with the method in Y. Caspi et al., "Spatio-Temporal Alignment of Sequences", *IEEE Transactions on Pattern Analysis and Machine Intelligence*, 24(11) (2002) 1409-1424. Row (d) is a comparison with the method in Y. Caspi et al., Feature-Based Sequence-to-Sequence Matching", *International Journal of Computer Vision*, 68(1) (2006) 53-64. Row (e) is a comparison with the method in Y. Ukrainitz et al., "Aligning Sequences and Actions by Maximizing Space-Time Correlations", *European Conference on Computer Vision* (2006) 538-550.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention.

Thus, the present invention should not be limited by any of the above-described exemplary embodiments.

For example, multiple examples of different types of video sequences are illustrated in FIGS. 4-6. However, those of ordinary skill in the art will understand that any type of video sequences can be used. For example, medical image video sequences (e.g., a moving heart) can be utilized in one embodiment.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A system for aligning at least two video sequences of at least one similar non-rigid scene, including, but not limited to:
    at least one application operable on at least one computer, the at least one application configured for:
    determining, utilizing at least one comparing videos application operable on at least one computer, which of the at least two video sequences should be aligned with each other, the determining including, but not limited to:
    modeling each video sequence as output of at least one linear dynamic system (LDS);
    jointly identifying parameters from at least two LDSs associated to the at least two video sequences of the at least one similar non-rigid scene stacked into a single matrix;
    transforming the parameters of all LDSs to a canonical form where the parameters of different video sequences are expressed with respect to a same basis;
    extracting features from the parameters of the LDSs; and
    using an image alignment algorithm to find a spatial transformation relating the features in order to spatially align the at least two video sequences with each other, wherein spatial alignment is found independent of temporal alignment.

2. The system of claim 1, wherein any image alignment technique can be utilized.

3. The system of claim 1, wherein the at least two video sequences are from synchronous and/or asynchronous cameras.

4. The system of claim 1, wherein the parameters are transformed into canonical form utilizing the Jordan Canonical Form (JCF).

5. A method for aligning at least two video sequences of at least one similar non-rigid scene, including, but not limited to:
    determining, utilizing at least one comparing videos application operable on at least one computer, which of the at least two video sequences should be aligned with each other, the determining including, but not limited to:
    modeling each video sequence as output of at least one linear dynamic system (LDS);
    identifying parameters from at least two LDSs associated to the at least two video sequences of the at least one similar non-rigid scene;
    jointly transforming the parameters of all LDSs to a canonical form where the parameters of different video sequences are expressed with respect to a same basis stacked into a single matrix;
    extracting features from the parameters of the LDSs; and
    using an image alignment algorithm to find a spatial transformation relating the features in order to spatially align the at least two video sequences with each other, wherein spatial alignment is found independent of temporal alignment.

6. The method of claim 5, wherein any image alignment technique can be utilized.

7. The method of claim 5, wherein the at least two video sequences are from synchronous and/or asynchronous cameras.

8. The method of claim 5, wherein the parameters are transformed into canonical form utilizing the Jordan Canonical Form (JCF).

* * * * *